United States Patent [19]

Peter et al.

[11] Patent Number: 6,107,696

[45] Date of Patent: *Aug. 22, 2000

[54] CIRCUITRY FOR FUNCTION MODULES WHICH CAN BE FITTED IN A MOTOR VEHICLE

[75] Inventors: Cornelius Peter, Buehl; Gerhard Knecht, Iffezheim; Bruno Frankenhauser, Goeppingen; Peter Jauernig, Tiefenbronn; Bernhard Friedl, Renningen, all of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/860,167

[22] PCT Filed: Nov. 25, 1995

[86] PCT No.: PCT/DE95/01670

§ 371 Date: Jan. 19, 1997

§ 102(e) Date: Jan. 19, 1997

[87] PCT Pub. No.: WO96/19361

PCT Pub. Date: Jun. 27, 1996

[30] Foreign Application Priority Data

Dec. 19, 1994 [DE] Germany ................ 44 45 110

[51] Int. Cl.[7] .................................................. H02M 3/00
[52] U.S. Cl. .................. 307/31; 307/10.1; 307/39; 307/42; 701/36

[58] Field of Search ......................... 307/9.1, 10.1, 307/31, 39, 42; 180/287; 701/29, 36, 45, 49; 370/383, 399

[56] References Cited

U.S. PATENT DOCUMENTS

| 4,825,362 | 4/1989 | Minami et al. . |
| 4,920,532 | 4/1990 | Wroblewski ............... 370/383 |
| 5,229,648 | 7/1993 | Sues et al. .................. 180/287 |

FOREIGN PATENT DOCUMENTS

| 0392411 | 1/1992 | European Pat. Off. . |
| 0470056 | 9/1993 | European Pat. Off. . |
| 8909146 | 1/1989 | WIPO . |

*Primary Examiner*—Albert W. Paladini
*Attorney, Agent, or Firm*—Venable; George Spencer; Norman N. Kunitz

[57] ABSTRACT

Circuitry, particularly for function modules that can be fitted in a motor vehicle and can be connected to a voltage supply and/or a control circuit. A central unit (12) is provided that includes at least one circuit arrangement (16, 36) for all of the function modules (22, 24, 26, 28, 30, 32, 40, 42, 44, 46, 48, 50, 52, 56, 58, 70, 72, 74, 76, 78, 80, 82, 84, 86, 88, 90, 96, 98), for conditioning voltage and/or control signals to be used by the modules; the central unit (12) is connected to the function modules, and the function modules are connected among themselves, by a bus system (62, 66). Moreover, the control unit (12) is coupled to a driver information module (40) by mechanical connections.

28 Claims, 3 Drawing Sheets

CIRCUITRY FOR FUNCTION MODULES WHICH CAN BE FITTED IN A MOTOR VEHICLE

BACKGROUND OF THE INVENTION

The invention relates to circuitry, particularly for function modules which can be fitted in a motor vehicle, and can be connected to a voltage supply and/or a control circuit.

RELATED ART

It is known to fit a plurality of function modules in a motor vehicle. Examples of function modules include windshield wiper motors for the front or rear window, external vehicle lighting, internal vehicle lighting, rear-window defroster, engine-cooling fan, fan motor for heating, airbag actuation, central locking, seat-height adjustment, electric window opener, etc. This list is merely exemplary, and is intended to elucidate the plurality of possible function modules of a motor vehicle. For supplying voltage to and actuating this plurality of function modules, it is known to install a cable harness in the motor vehicle that permits the connection of the individual function modules to a voltage source, which, in a motor vehicle, is typically a motor vehicle battery. The cable harness further permits the connection to operating elements and different sensors. Due to the numerous connection paths and the different installation location of the individual function modules, the cable harness necessary for the wiring encompasses a plurality of individual connection leads. In addition to the considerable outlay involved in installing the cable harness in the motor vehicle, it is disadvantageous that an installed cable harness is not designed for retrofitting with function modules in the motor vehicle. The function modules installed later require completely new cabling, which is associated with a relatively high installation expense.

It is also disadvantageous that only a limited quantity of information about the motor vehicle, particularly about the current operating state, external conditions, etc., is available to the individual function modules. It is therefore not possible to match the action of the individual function modules to a changing operating state.

SUMMARY ADVANTAGES OF THE INVENTION

The above disadvantages of the known systems are overcome according to the present invention by an apparatus having: a plurality of function modules that are fitted in a motor vehicle, a central unit which is connected to the function modules; and the function modules are connected to one another, by a bus system; and the central unit is coupled directly to a driver-information and display module by mechanical connections.

In contrast, the circuitry according to the invention, having the as described above, has the advantage that a networked, modular system of individual function modules that can all jointly access relevant information about the operating state can be created simply. Because a central unit is provided that includes at least one conditioning circuit for all voltage and/or control signals that can be used jointly by the function modules, and the central unit can be connected to the function modules by way of a bus system, it is advantageously possible to perform an information exchange between the individual function modules and the central unit that permits the modules to react, matching one another, to specific operating states, or changing operating states, of the motor vehicle.

A particular advantage is that it is possible to design the at least one conditioning circuit present in the central unit such that it can query function modules that comprise sensors and are permanently selectable by way of the bus system in order to condition the information about the operating state of the motor vehicle to be ready for retrieval. For example, information about operating temperatures, speed, setting of the motor management, air-quality information, etc., can be kept ready. With the connection of the individual function modules by way of the bus system, each function module can access relevant information about the execution of a relevant bus protocol known per se. Furthermore, the bus system is designed such that the different function modules can exchange information directly with each other by way of the central unit, insofar as it is necessary or practical for their functioning. Therefore, it is possible to combine the entire so-called car-body electronics of a motor vehicle with this modular system to permit a matched reaction with few means. In particular, it is possible to provide the function modules at the manufacturing site with the necessary electronics matched to the specific function module, while central tasks are undertaken by the central unit. At any time, the function modules can access information of interest to the other function modules by way of the bus system, or provide information for other function modules.

It is further preferred for the central unit to simultaneously include a conditioning for the supply voltage of the individual function modules. It is therefore possible to execute a central conditioning of the supply voltage, for example a voltage stabilization, a voltage filtering, etc. Each of the individual function modules can be freed from this task and therefore be constructed more simply.

Further advantageous embodiments ensue from the other features disclosed in the dependent claims.

The invention is described in detail below by various embodiments, in conjunction with the attached drawings.

DETAILED DESCRIPTION OF THE PREFERRED EMBODIMENTS

Figure 1:
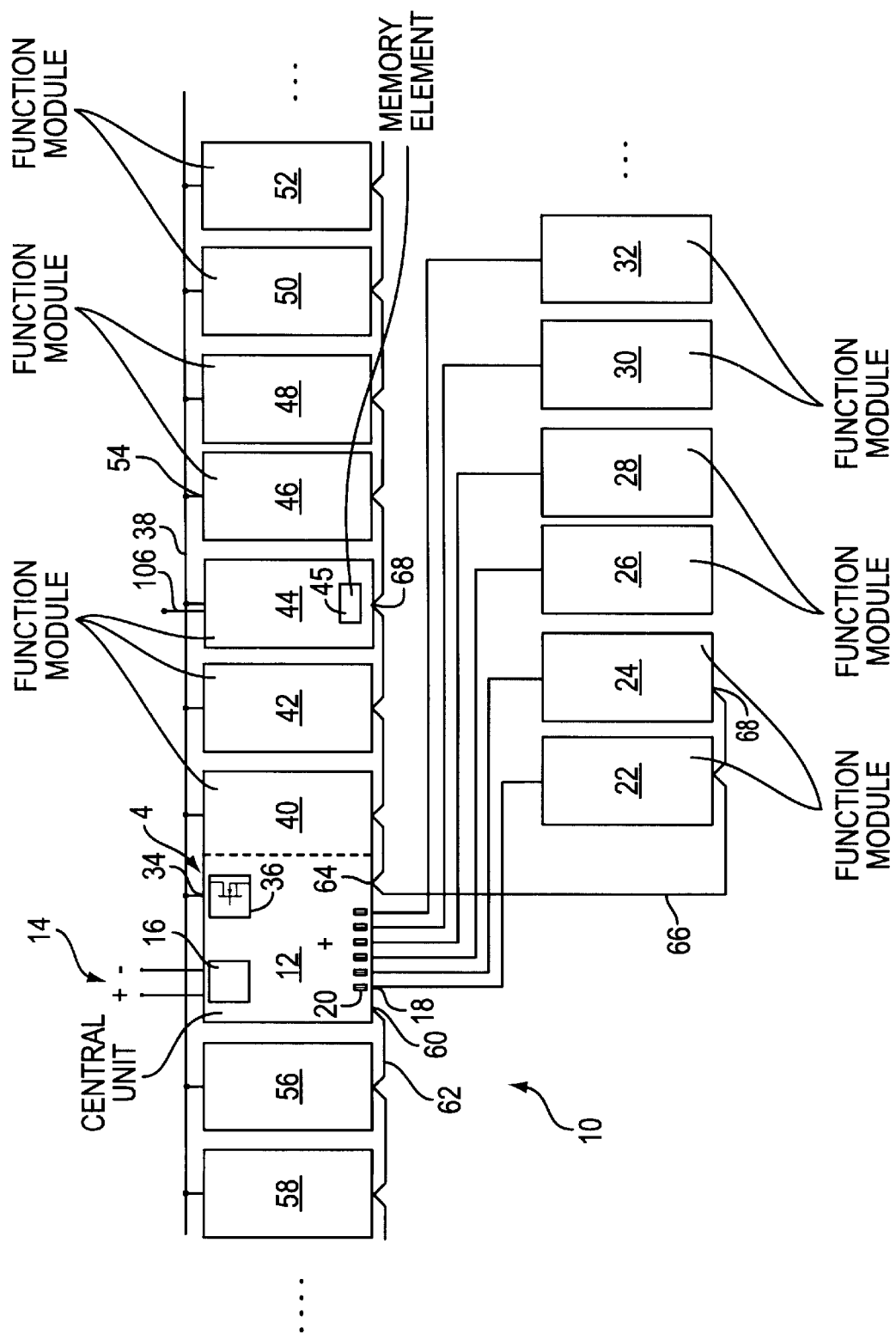
FIG. 1 is a block diagram of the circuitry according to the invention.

FIG. 1 shows a block diagram of circuitry indicated generally by 10. The core feature of the circuitry 10 is a central unit 12, which can be connected to a voltage source 14, for example the battery or a generator of a motor vehicle. The central unit 12 includes circuitry 16, only indicated schematically here, whose function will be explained below. The central unit 12 further includes first outputs 18, with a total of six being provided in the illustrated embodiment. The plus-potential of the voltage source 14 is switched through to the outputs 18. A safety fuse 20 is associated with each of the outputs 18. The safety fuses 20 are configured, for example, as fusible cut-outs dimensioned to correspond to the consumer or load connected to the respective output 18. Each output 18 is connected to a function module. In the illustrated embodiment, a first function module 22 is, for example, a fan motor for motor vehicle heating. A second function module 24 is an EC motor for a compressor of an air-conditioning system of the motor vehicle, not shown. A third function module 26 can be, for example, an electric wiper motor for front windshield wipers, while a function module 28 can be, for example, an electric wiper motor for rear windshield wipers. A next function module 30 is, for example, a fan motor for an engine cooling, and a function module 32 is a motor for electrical vehicle window openers. The series of function modules that can be connected to the outputs 18 can be expanded by the provision of every equipment option of the motor vehicle, for example motors for central locking, motors for seat-height adjustment, motors for operating a sun roof, etc.

The central unit 12 additionally includes a further output 34 which is connected to a voltage-conditioning circuit 36 of the central unit 12. The voltage-conditioning circuit 36 ensures that a voltage U that meets the conditions defined for the electronic components that can be connected to the output 34 is applied to the output 34. In particular, a voltage limit to values of voltage $U \leqq 16$ Volts, a pulse filtering of the voltage U, etc., are effected. Thus, for example, reverse battery protection or overvoltage protection is effected for the electronic components connected to the output 34, which will be discussed below. A supply network 38, to which further function modules that can be operated with the voltage U applied to the output 34 can be connected, branches off from the output 34. These further function modules can be, for example, a driver-information module 40, an operating module 42, an airbag module 44, an rpm-measuring module 46, an air-quality sensor module 48, a rain-sensor module 50, a radio module 52, etc. Further function modules such as a drive-block module, an ignition-lock module, etc., can be connected to the supply network. The function modules respectively have an input 54, by way of which they can be connected to the supply network 38.

A motor-control module 56, an ABS module 58 and further modules, not shown, for example an ASC (anti-slip control) module, ACC (automatic coupling control) module, etc., can be provided as further function modules, shown to the left of the central unit 12.

The subdivision of the function modules into three types of function modules is simultaneously clarified by the overview in FIG. 1. These types are, firstly, the so-called high-current consumers connected to the outputs 18, and secondly, the modules configured as operating and/or sensor elements (to the right of the central unit 12) and the motor and chassis modules (to the left of the central unit 12). The drawing gives no indication of the spatial arrangement of the individual function modules in the motor vehicle.

The central unit 12 further includes a connection 60, which is connected to the modules 56 and 80 of a bus line 62. A further connection 64 is connected to the function modules 40, 42, 44, 46, 48, 50, 52, 22 and 24 by a further bus line 66. The connections 60 and 64 of the central unit 12 are connected to the circuitry 16. The bus lines 62 and 66 thus form a system in which the individual function modules are coupled to one another via the central unit 12. The design of the bus lines 62 and 66 is standard for transmitting and recognizing a bus protocol. Each function module has an input 68 and a circuit associated with the input 68, by way of which the bus lines 62 and 66, respectively, can respond, i.e., can be used. This circuit can include, for example, a timing circuit, so a bus protocol can be retrieved in definable time intervals.

The circuitry 10 shown in FIG. 1 represents a circuit diagram of the overall, so-called car-body electronics of a motor vehicle, and performs the following function:

In the intended use of the motor vehicle, the operating voltage provided by the voltage source 14 is applied to the central unit 12. The central unit 12 distributes the operating voltage directly, via the outputs 18, to the function modules indicated here by 22 through 32. The voltage-conditioning circuit 36 simultaneously provides or conditions the operating voltage for the remaining function modules.

By means of the driver-information module 40, the necessary data for driving the motor vehicle are transmitted to the vehicle driver. The driver-information module 40 can include different display instruments, depending on the equipment variation of the motor vehicle provided with the circuitry 10. Thus, it is conceivable that, according to a basic variation of the motor vehicle provided with the circuitry 10, the driver-information module 40 has, for example, a tachometer, warning pictographs for certain critical operating states of the motor vehicle, which are shown on displays, and display lamps for signaling the operating function of the lighting system, for example the turn signal, the headlight and the hazard light system. Moreover, a multi-function display can be provided, on which the number of kilometers driven, fuel-tank display, etc., can be shown. The driver-information module 40 can advantageously be coupled directly to the central unit 12, as indicated by the dashed line in FIG. 1. The connection can be produced advantageously by corresponding mechanical, detachable connections between the driver-information module 40 and the central unit 12. The electrical connection between the central unit 12 and the driver-information module 40 can, for example, be effected by a four-pole standard interface, which can be contacted in the mechanical connection of the module. A resulting advantage is that no further cabling is necessary between the central unit 12 and the driver-information 40. The current supply of the driver-information module 40 is effected by the supply network 38, with the voltage U having been pre-stabilized by the voltage-conditioning circuit 36, so no further circuits need to be be provided in the driver-information module 40 for this purpose. This described variation of the configuration of the driver-information module 40, as a base module, permits the driver-information module 40 to be de-coupled, for example unlatched, from the central unit 12, and replaced by another driver-information module when the equipment of the motor vehicle is changed. Because of the standard interface provided between the central unit 12 and the respective driver-information module 40 to be coupled, an arbitrary exchange can be effected simply, without necessitating additional cabling. This driver-information module 40 to be exchanged can additionally include, for example, an rpm-measuring device, a radio, a clock, a navigation display, temperature displays, etc. Through the exchange of the driver-information module 40, therefore, the motor vehicle can be provided with additional display and/or operating elements without a large outlay.

In accordance with a further embodiment variation, not shown, the driver-information module 40 configured as a base module can be provided, on a side not facing the central unit 12, with further connection points, that is, standard interfaces and mechanical latching options, for expansion modules. Thus, the base unit comprising the central unit 12 and the driver-information module 40 can be expanded by an arbitrary number of modules without requiring extensive additional cabling. This is particularly advantageous if the central unit 12 is disposed in the vehicle dashboard, with corresponding recesses being provided in the dashboard for docking the further modules, which recesses can be covered if not being used. The flexibility in equipment is boundless.

The central unit 12 further includes operating elements, not shown here, with which individual function modules can be operated. In particular, the corresponding function modules absolutely necessary for driving safety of the motor vehicle can be operated by means of the operating elements provided, for example, in a basic level of equipment. These elements can be, for example, the lighting system, the blinker system, the window-wiper system for front and rear windows, etc. Further operating elements can be combined with the central unit 12, for example, by the operating module 42. Similarly to the driver-information modules 40 explained above, the operating module 42 can be combined with the central unit 12 and/or the driver-information module 40 through a simple docking that simultaneously effects an electrical and mechanical fastening. The operating module 42 can now have further operating elements for equipment variations of the motor vehicle that are not necessarily part of a basic level of equipment. It can be, for example, a multi-stage heating setting, or an actuation of the air-conditioning system, electric sun roof, etc. Again, any combination is feasible that can be adapted to the respective equipment variation of the motor vehicle. The central unit 12 combined with the driver-information module 40 and/or the operating module 42 is disposed such that it is readily visible to the driver at any time, and the operating elements disposed or docked thereon can be operated safely. By means of the operating elements, the respectively associated outputs 18 of the central unit 12 can are connected to the function modules 22 through 32 that perform the correspondingly-selected functions, so they are connected to the voltage source 14 by way of the central unit 12.

The individual function modules can communicate with one another by the bus lines 62 or 66 connected to one another via the circuitry 16. The circuitry 16 assumes a central control function that controls the ability of the individual function modules to retrieve or respond. To this end, the circuitry 16 can allocate priority signals, for example, that regulate the access authorization of the individual function modules to the bus. Corresponding to the control signals originating from the circuitry 16, specific function modules can retrieve signals specified for them. At the same time, it is possible for the function modules to exchange information among themselves or simultaneously obtain control signals specified by the circuitry, which signals permit matched reacting.

Thus, in accordance with an embodiment selected merely for explanation purposes, it is conceivable for the function module 50, which is configured as a rain sensor, to detect precipitation, in which instance corresponding information is sent to the circuitry 16 via the bus line 66. This information is processed so as to effect a contacting of the function module 26 and/or 28 with the voltage source 14, causing the wiper motors to function.

A further example is the detection of a change in the pollution content in the ambient air in the motor vehicle by the function module 48 configured as an air-quality sensor, and the transmission of this information to the circuitry 16 via the bus line 66, whereupon the circuitry provides a signal for a function module that closes a fresh air/circulating air door in the air-conditioning system.

If the function module 48 configured as an air-quality sensor is designed, for example, for measuring the air quality in the passenger compartment, the switching of the heating or air-conditioning system from fresh air to circulating air can be influenced by the assessment of air quality. These options, which are only chosen by way of example, clarify the linkage of the individual function modules among themselves by way of the bus lines 62 or 66. These examples can be extended for different combinations of individual function modules that are matched in reaction.

Overall, a modular system is created for the car-body electronics that can be adapted to the concrete motor vehicle, corresponding to the respective requirements, by the configuration of different function modules that include fundamental or base functions, and expansion modules. The modular system can be reconstructed or disassembled in a simple manner with the function modules that can be combined with one another, and with the networking thereof by way of the bus lines 62 or 66, and with the common voltage supply by way of the central unit 12. In particular, later desires to enhance the equipment of the motor vehicle can be easily taken into consideration, because no new, that is, additional, cabling is necessary. All further, additional equipment variations can be taken into consideration with the connection to the already-installed, standard cable harness, which includes the bus line 62 or 66 and the supply network 38.

The concentration of the essential control or supply functions in the central unit 12 is advantageous with respect to manufacturing technology. A module hardware used in the central unit 12 in the circuitry 16 can therefore be used optimally by all of the function modules by way of the bus lines 62 or 66. With the additional integration of operating elements, the voltage-conditioning circuit 36 and the safety fuses 20 into the central unit 12, a compact unit is created that can be mass-produced economically, and whose installation into the respective motor vehicle only requires one further step.

Figure 2:
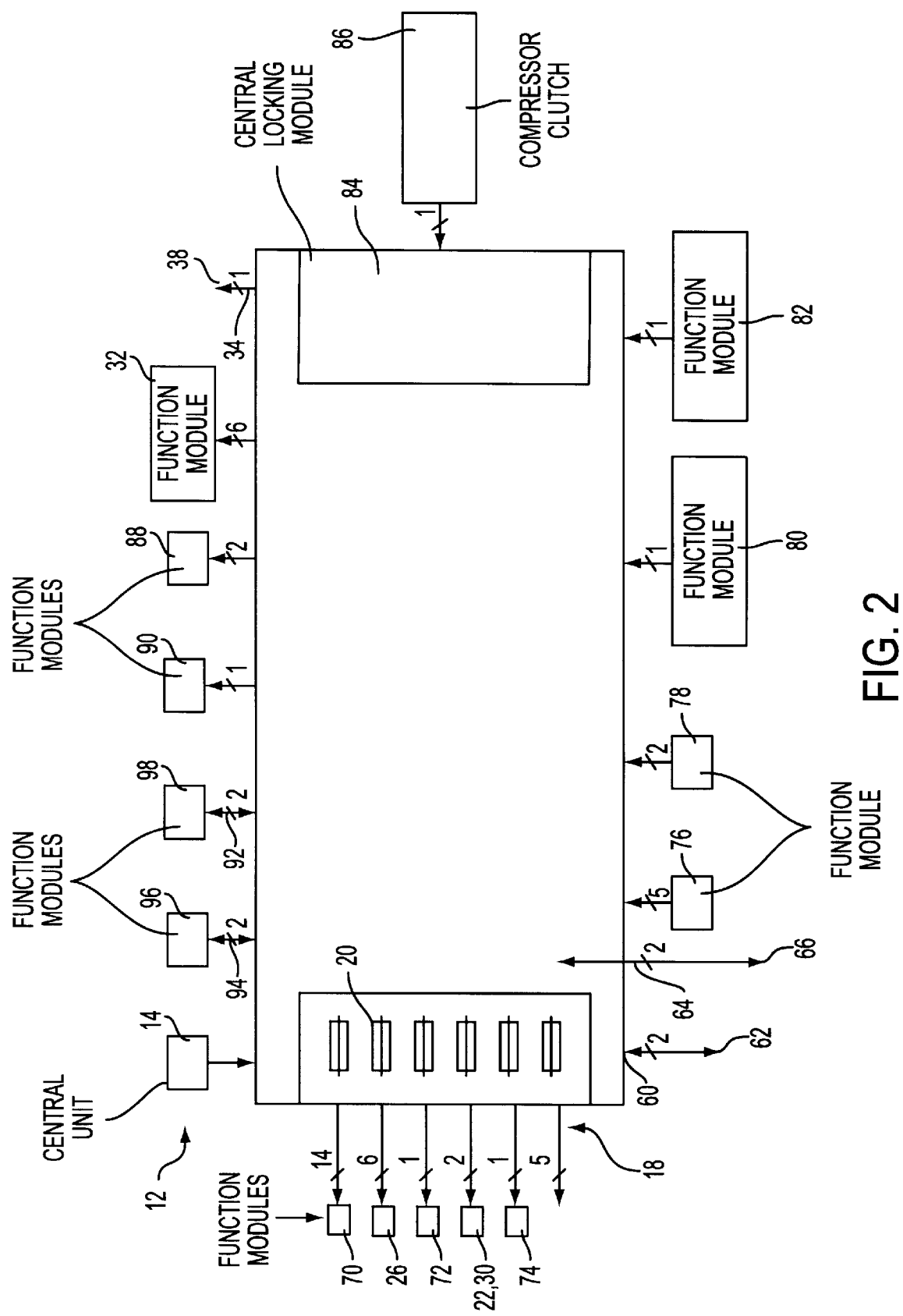
FIG. 2 is a schematic representation of a possible design of the central unit.

FIG. 2 schematically shows a central unit 12 in a possible equipment variation. Parts that are identical to those shown in FIG. 1 are provided with the same reference numerals, and are not re-explained. The central unit 12 includes the safety fuses 20, which are respectively disposed between the voltage source 14 and the outputs 18. For the sake of a clear overview, distributors, which are, of course, necessary, are not shown. The outputs 18 are respectively connected to function modules. The numbers provided at the outputs clarify the number of cables leading to the individual function modules. A lighting module 70, for example, is connected to the central unit 12 by fourteen individual cables. Of course, the function module 70 is a combination of the individual lights disposed at different positions on the motor vehicle. Moreover, the module 26 already mentioned in FIG. 1 is connected to the central unit 12 six cables. A horn module 72 is connected to the central unit 12 by one cable, and the fan module 22 or 30 and a rear-windshield-defroster module 74 are connected by the respective number of cables. Furthermore, a reserve cabling is provided with five individual cables for retrofitting with further modules. The bus lines 62 and 66 are only indicated here. A so-called CAN bus can be used as a bus system, with the bus line 62 forming a CAN gateway. A function module 76 configured as a door-contact switch and a function module 78 configured as a fuel-level indicator are further connected to the central unit 12. A function module 80 that includes operating elements fitted in the steering wheel of the motor vehicle can further be connected. A further function module 82 can be a switching element for triggering the central locking. The central unit 12 can be provided with a separate central-locking module 84 that is connected to a compressor clutch 86. Moreover, the function module 32, which includes central-locking motors, is connected to the central unit 12. Further function modules 88 and 90 are formed by a change-over switch between fresh air and circulating air for the heater, or a water valve. An ignition-lock transponder can be connected as a function module 96, and a contact-path wiper can be connected as a function module 98, via further, bidirectional line connections 92 or 94.

It is generally apparent that a plurality of widely-varying function modules can be connected, in particular purposefully connected, to one another by means of a single, compact control unit 12.

Figure 3:
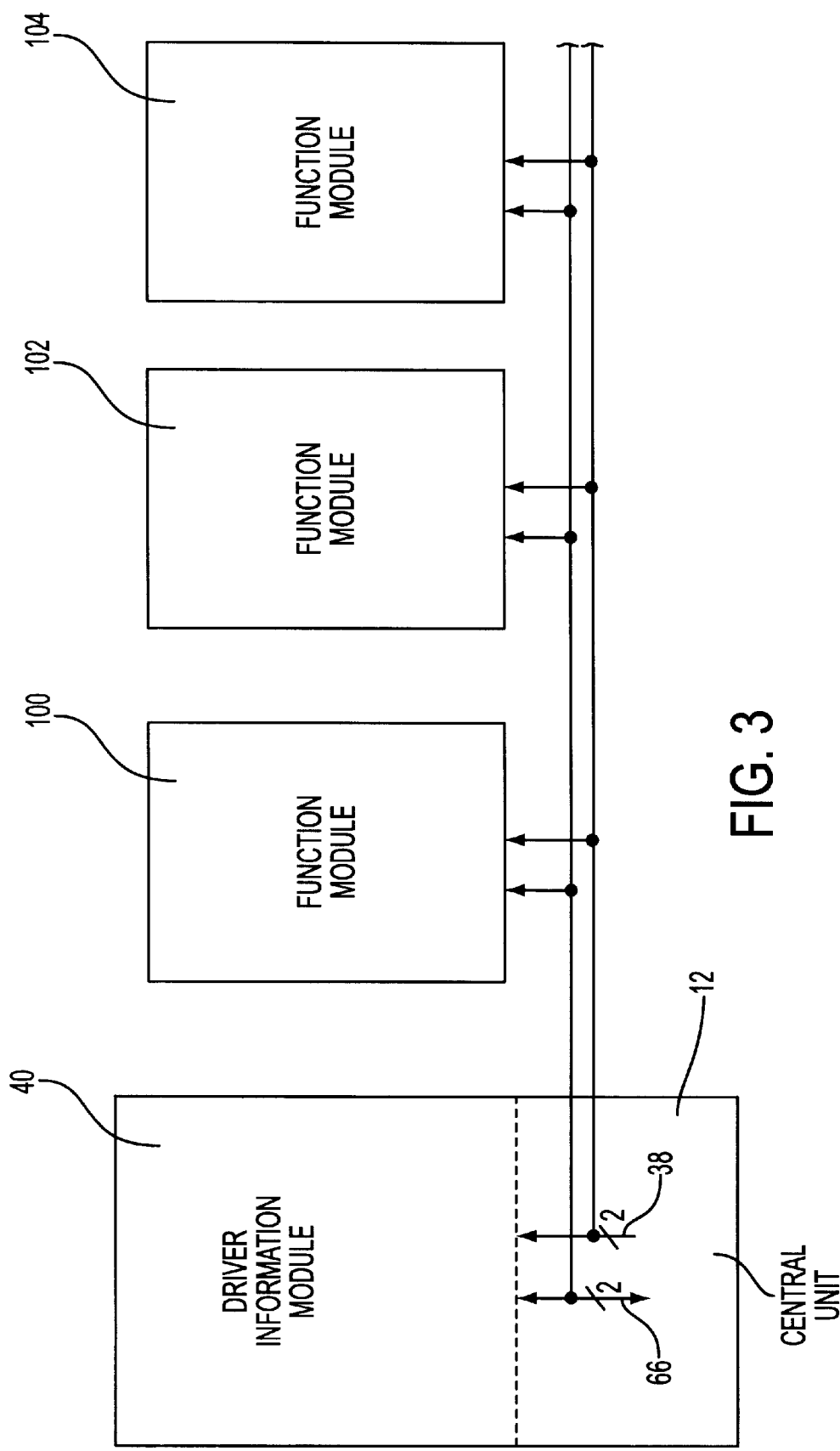
FIG. 3 is a schematic view of a possible design of a driver-information module.

FIG. 3 shows, again schematically, the arrangement of the central unit 12 already explained in conjunction with FIG. 1, with the combined driver-information module 40. Again, a dashed line is used to indicate that the central unit 12 can be mechanically stopped and electrically coupled to the information module 40 by a simple connection. The driver-information module 40 can be provided with expansion modules in addition to the basic equipment, which may comprise, for example, a tachometer, a multi-function display and warning pictographs. These expansion modules are either provided in addition to the already-present driver-information module 40 in that they are controlled parallel to the supply network 38 providing the operating voltage, and the bus line 66. FIG. 3 shows, by way of example, a function module 100, which can encompass an electronic navigator. A function module 102 can be, for example, a navigation module, and a function module 104 can be, for example, an rpm-measuring device. As explained above, the number of combined modules can be expanded corresponding to the requirements.

A complete car-body electronics for a motor vehicle can be embodied simply by means of the entire system comprising the central unit 12, the individual function modules, and the supply network 38 and bus lines 62 or 66 connecting the function modules among themselves. Through the configuration of the central unit 12, the control can be completely centralized, for which purpose only a hardware module, which is a component of the circuitry 16, must be provided. Above all, an optimum use of the circuitry 16 results for the entire car-body electronics. A time-shared use of signals generated one time is possible due to the actuation of the function modules by means of the bus lines 62 or 66. Regardless of where these signals are generated, whether in the circuitry 16, for example, or in individual function modules, they are equally available to all of the function modules.

Furthermore, the number of individual cables for the entire car-body electronics can be reduced through the use of a standard cable harness to which the individual function modules can be connected as needed. In particular, the single present bus line 62 or 66 permits a further connection of function modules that can be integrated into the entire group system a bus-actuation electronics present in the function modules. The time-sharing of the cable harness for a plurality of function modules reduces material, and thus weight, in addition to the decrease in installation outlay.

A further advantage lies in the central voltage-conditioning circuit 36, which assumes the tasks of over-voltage protection and pulse filtering of the voltage for all of the function modules. Consequently, corresponding components in the function modules that assume the task of protecting the electronic circuits present in the function modules from voltage fluctuations no longer need to be provided.

Further advantageous embodiments of the modular system of the car-body electronics according to the invention relate to the fact that the airbag module indicated by 44 in FIG. 1 assumes a central function for actuating airbags provided in the motor vehicle, for example driver- and passenger-side airbags, and the actuation of further safety functions. On the one hand, the generally-known acceleration sensors that effect the triggering of the safety systems can be disposed in the airbag module 44. With the detection of a corresponding signal, this information can be sent to the bus line 66 and thus to the circuitry 16. Through the allocation of very high priority to these information signals, all other bus protocols already being processed on the bus line 62 or 66 can be interrupted by the bus actuation of the airbag module 44, and the safety system can be triggered with high priority. This could be the case, for example, in the actuation of seat-belt tighteners, in a non-stop function of a gasoline pump and in an emergency release of the central locking. This ensures that all of the safety functions of the motor vehicle are triggered with the greatest reliability and on the shortest paths, that is, within the shortest available time. Through the direct coupling of the individual function modules by the bus lines 62 or 66, a selection that was previously programmed into corresponding memory elements of the circuitry 16 or the airbag module 44 can determine the priority of the actuation of individual function modules. Furthermore, it is advantageously provided that the airbag module 44 has at least one memory element 45 that continuously reads and stores the bus protocols transferred via the bus lines 62 or 66. The storage can preferably be effected in a freely-selectable time interval, so that, for example, the operating states of the motor vehicle, the switching state of the individual function modules, etc., can be stored within a last time span of, for example, 30 seconds. Furthermore, general information about the motor vehicle, such as its age, its overall transmission time, its mileage, etc., can be stored continuously. If the motor vehicle is involved in an accident, the permanently-stored data and the data stored in time intervals remain in the memory means of the airbag module 44, so the means can be used to determine the cause of the accident—much like the flight recorder of an aircraft. Moreover, the airbag module 44 can be connected by way of the bus line 66 to different, further function modules formed by sensors, so that, for example, a recognition of an occupied seat of the motor vehicle, a so-called child-seat recognition, and a seat-belt-lock monitoring can be integrated. In the evaluation of all of this present information, the airbag module 44 can purposefully control the triggering of the safety systems for the event of an accident.

The airbag sensor 44 can advantageously be provided with an interface indicated by 106 in FIG. 1 that permits the connection of an external diagnostic device for the entire motor vehicle. In this way, the bus-line system 62, 66 present once in the motor vehicle can be used for a comprehensive diagnosis of the individual function modules, that is, particularly for a test of their operating ability, or for an external setting of the control electronics included in the individual function modules.

Moreover, a vehicle identification can be coded simply through the networking of the individual function modules with the central unit 12 via the cable harness formed by the bus lines 62 or 66 and the supply network 38. In this instance, it is advantageously possible for all of the function modules to obtain a neutral code during their production that can be entered, for example, into the bus-actuation electronics of the individual function modules. Thus, the operating ability of the individual modules is assured, regardless of their initial connection in the total system. In the basic equipment of a specific passenger car, the function modules combined for this specific passenger car and the central unit 12 are programmed with a vehicle-specific identification code, so that they can exchange bus protocols among themselves by way of the bus system and communicate with one another in the manner described above. Thus, each of the function modules can be matched simply to the specific vehicle. The coding of the individual function modules to a specific vehicle assures protection of the individual function modules against theft; they cannot function in another vehicle, because they possess an identification that is tailored to a specific vehicle. The setting of the vehicle identification code for a particular vehicle, which is effected in the central unit 12 or in individual function modules, simultaneously ensures that, if the entire system is later retrofitted with an additional function module, the module can automatically learn the vehicle identification code tailored to the vehicle. Thus, the additional function modules can easily be incorporated into the overall system. The connected system can only be re-coded with the use of a PIN code given to the vehicle owner at the time of acquisition. This PIN code permits re-coding of the connection for the case that individual function modules are to be exchanged or temporarily removed from the system for a repair. The coding of the vehicle identification simultaneously permits the integration of theft protection of the entire vehicle, for example through the blockage of the communication of the individual function modules and the central unit 12 among themselves by means of bus protocols by way of the bus lines 62 or 66. The blocking of all or possibly only selected function modules reliably prevents startup of the motor vehicle. The desired startup can be initiated by a corresponding control command that is contingent upon, for example, the insertion of a special ignition key into the function module 96 (FIG. 2), so a data exchange with the central unit 12 that detects authorized access by the driver inserting the ignition key into the function module 96 takes place by way of the bidirectional connection 94. Thus, manipulations of the overall vehicle electronics would be prevented simply, or at least impeded considerably, improving the theft protection of the vehicle.

To conclude, it is pointed out that, with the networking options of the central unit 12 with the widely-varying function modules by way of a unified, standard cable harness, without necessitating retrofitting of the standard cable harness for expansion with additional function modules, very complex car-body electronics can be achieved that is multifaceted with respect to its applicability, and that automatically reacts to many different operating conditions. The networking of the function modules and the central unit 12 among themselves by the bus system 62 or 66 results in additional function features, without necessitating independent function modules for this purpose. These additional functions result from the combination of at least two of the present function modules, or of the central unit 12 and its communication via the bus system. Examples of additional functions include a time-out interior lighting, a motor-protection function for the front and rear windshield wipers, an automatic wipe/wash control, an alarm system, theft protection, a release of the central locking when the airbag is actuated, and an accident data recorder. The only limitation with respect to the use of the standard cable harness comprising the individual lines that form the bus lines 62 or 66 and the supply network 38 is in the case that, for example, a vehicle that has already been acquired is to be retrofitted with an electric window opener and central locking. To this end, additional, corresponding cables must be installed in the corresponding doors. In accordance with a further embodiment variation, these additional cables can already be incorporated into the standard cable harness, and installed without a connection of the corresponding function modules, up to the installation points in the doors without the provision of the necessary function modules.

The invention is not limited to the exemplary function modules mentioned in the description. Of course, any other type of function module that can conceivably be used in vehicles of any type is possible. A decisive factor is that the entire system of networking the function modules with the central unit 12 is effected by way of a bus system, so the function modules can communicate among themselves and possibly react or trigger automatically, matched to one another.

What is claimed is:

1. Apparatus having a plurality of function modules that are fitted in a motor vehicle, a central unit which is connected to the function modules, and the function modules are connected to one another, by a bus system, and wherein: the central unit is coupled directly to a driver-information module by a detachable mechanical connections; and, a voltage-conditioning circuit, that is disposed in the central unit, for producing and supplying a conditioned supply voltage to the function modules via a supply network, that is separate from the bus system, and connects the voltage conditioning circuit of the central unit to the respective function modules, whereby the respective function modules do not have a corresponding voltage conditioning circuit.

2. Apparatus according to claim 1, wherein the bus system and the supply network are formed by a standard cable harness to which additional function modules can be connected by an existing reserve cabling.

3. Apparatus according to claim 2, wherein voltage signals applied by at least one of the bus system and the supply network are used simultaneously by different function modules.

4. Apparatus according to claim 1, wherein a selectable number of function modules are connected to the bus system.

5. Apparatus according to claim 1, wherein the central unit includes safety fuses for the function modules (full-load consumers) that are connected to the central unit.

6. Apparatus according to claim 1, wherein the central unit has operating elements for selectable function elements.

7. Apparatus according to claim 1, wherein the central unit is directly combined with an operating module.

8. Apparatus according to claim 7, wherein the operating module is detachably connected to the central unit.

9. Apparatus according to claim 7, wherein the operating module is connected in an electrically-conductive manner to the central unit by a standard interface.

10. Apparatus according to claim 7, wherein at least one of the driver-information module and the operating module is expanded in modular fashion from a basic variation, corresponding to a selectable equipment variation of the motor vehicle.

11. Apparatus according to claim 1, wherein an airbag module provided as a function module assumes control of all safety functions of the motor vehicle via the bus system.

12. Apparatus according to claim 11, wherein the airbag module includes at least one acceleration sensor and an ignition circuit for the function modules that trigger the safety functions.

13. Apparatus according to claim 11, wherein control signals having high priority are entered into the bus system by the airbag module, which control signals stop the processing of control signals (bus protocols) of normal priority.

14. Apparatus according to claim 11, wherein the airbag module includes a memory element that is connected to the bus system.

15. Apparatus according to claim 14, wherein the memory element stores bus protocols transmitted by the bus system.

16. Apparatus according to claim 15, wherein the memory element stores the transmitted bus protocols in a selectable time unit, with previously-stored bus protocols being overwritten in the process.

17. Apparatus according to claim 14, wherein the memory element stores general motor-vehicle operating data.

18. Apparatus according to claim 11, wherein the airbag module has an interface, via which at least one of an external diagnosis and an external setting of at least one of the central unit (12) and the function modules is possible.

19. Apparatus according to claim 1, wherein a vehicle identification code is entered into at least one of the central unit and the function modules via the bus system.

20. Apparatus according to claim 1, wherein the function modules connected to the central unit by the bus system include a vehicle-specific identification code.

21. Apparatus according to claim 20, wherein the vehicle-specific identification code can be learned, via the bus system, by function modules that are connected to the bus system later, but the code can only be used in the bus system of a specific motor vehicle.

22. Apparatus according to claim 19, wherein the vehicle identification code is programmable via an external PIN code.

23. Apparatus according to claim 19, wherein motor vehicle theft protection is integrated by the vehicle identification code in that the bus system is at least partly blocked by at least one function module.

24. Apparatus according to claim 1, wherein the driver information module transmits and displays data for controlling the motor vehicle to a vehicle driver; and the driver information module is electrically connected to the central unit by a standard electrical interface which establishes contact during the mechanical connection of the driver information module and the central unit.

25. Apparatus disposed in a motor vehicle and including: a plurality of function modules; a central unit; a bus system connecting the central unit with the function modules and the function modules to each other; and, a voltage-conditioning circuit that is disposed in the central unit, that produces a conditioned supply voltage for the function modules, and that supplies the conditioned supply voltage to the function modules, which are connected to the central unit, via a voltage supply network separate from the bus system, whereby the respective function modules do not have a corresponding voltage conditioning circuit.

26. Apparatus according to claim 25, wherein the voltage conditioning circuit is a circuit for carrying out a central processing of the supply voltage for the individual function modules.

27. Apparatus according to claim 26, wherein the voltage conditioning circuit is a voltage stabilization circuit.

28. Apparatus according to claim 26, wherein the voltage conditioning circuit is a voltage filtering circuit.

* * * * *